Sept. 15, 1964     F. BEVILACQUA ETAL     3,149,048
NUCLEAR REACTOR CONTROL DEVICE
Filed Dec. 2, 1960
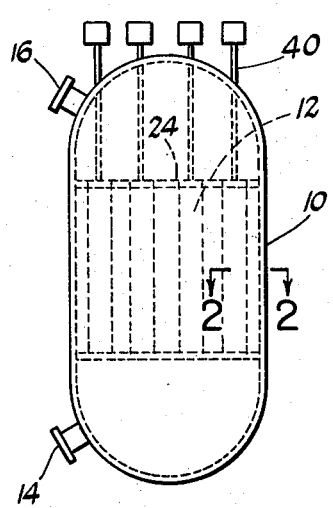
FIG. 1
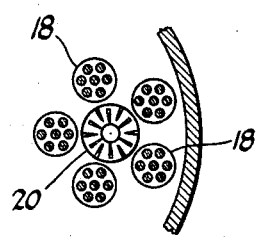
FIG. 2
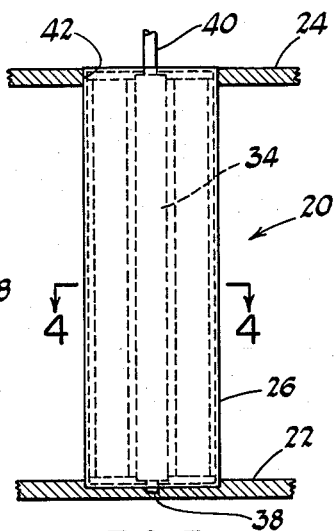
FIG. 3
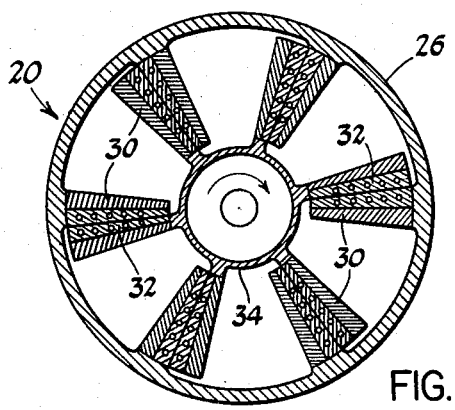
FIG. 4
FIG. 5
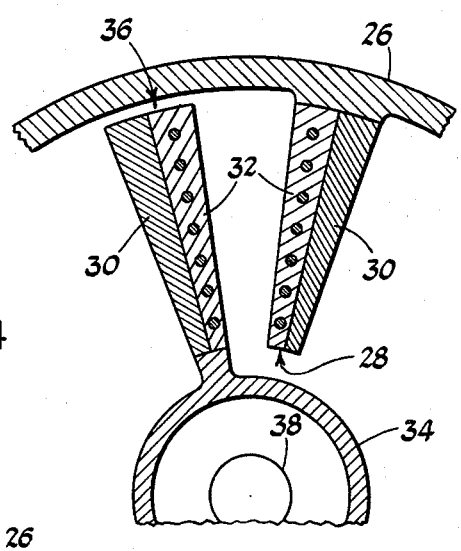
FIG. 6
INVENTORS
ROBERT W. DEUTSCH
FRANK BEVILACQUA
BY Eldon H. Luther
ATTORNEY

United States Patent Office 3,149,048
Patented Sept. 15, 1964

3,149,048
NUCLEAR REACTOR CONTROL DEVICE
Frank Bevilacqua and Robert W. Deutsch, Clearwater, Fla., assignors to General Nuclear Engineering Corporation, Dunedin, Fla., a corporation of Delaware
Filed Dec. 2, 1960, Ser. No. 73,441
3 Claims. (Cl. 176—86)

This invention relates generally to a nuclear reactor control device and particularly to an improved control wherein the control device remains within the reactor core and control is effected by internal movement within the core of a neutron poison, to and from a position of low neutron flux and a position of high neutron flux.

It is recognized that the employment of a reactor control which does not necessitate the longitudinal or axial movement of control rods into and out of the core of the reactor has decided advantages in that these longitudinally movable control rods produce non-uniform flux distributions within the reactor core axially thereof and necessitate relatively complicated mechanical mechanisms to produce the required movement of the rod.

The present invention is directed to a control device which includes both a poison and a fuel, i.e. a material of high neutron absorption cross-section and a fissionable material, with these materials extending throughout the length of the device and the device being constructed in such a manner that the neutron poison is movable to and from a region of low neutron flux and a region of high neutron flux within the reactor core.

In addition to providing a simpler mechanical arrangement for moving the control device as well as eliminating axial flux distortions incident to adjustment of the control, the presence of a poison at all times within the reactor core acts as a safety feature in that it reduces the possibility of a catastrophic accident. This becomes clear when it is considered that a poison can be neglected during th reactor operation because of fuel self-shielding, but during a reactor excursion the fuel can become more transparent because of a neutron spectrum shift and the increased activity can be partly compensated by increased poison absorption without any mechanical movement.

Clumped nuclear fuels have the property of reducing the neutron intensity as a function of penetration into the fuel; this effect is commonly known as self-shielding. The self-shielding is a function of the thermal macroscopic absorption cross-section and the fuel thickness. For fuel elements that possess a large self-shielding, i.e. large macroscopic absorption or quite thick, the presence of a neutron poison in the middle of the fuel has a very small effect on the neutron economy. The movement of this neutron poison from a position where it is effectively shielded from surrounding fuel elements to a position where its surface is exposed to the surface fuel neutron flux of such surrounding elements will cause a decrease in the reactor reactivity.

Accordingly it is an object of this invention to provide a reactor control device which is to be disposed in the core of the reactor employing a poison that is adapted to be permanently retained in the core of the reactor and be movable therewithin.

Other and further objects of the invention will become apparent to those skilled in the art as the description proceeds.

With the aforementioned objects in view, the invention comprises an arrangement, construction and combination of the elements of the inventive organization in such manner as to attain the results desired as hereinafter more particularly set forth in the following detailed description of the invention as shown by the accompanying drawings wherein:

FIG. 1 is in the nature of a vertical elevational view of a nuclear reactor embodying the present invention;

FIG. 2 is a transverse sectional view, fragmentary in nature, showing details of the core construction of the reactor and generally taken along 2—2 of FIG. 1;

FIG. 3 is a vertical elevational view of the control device of the invention;

FIG. 4 is a sectional view of the control device taken along line 4—4 of FIG. 3;

FIG. 5 is a view similar to that of FIG. 4 but showing the control device in the other of its extreme positions, and FIG. 6 is an enlarged fragmentary transverse section of the control device.

Referring now to the drawings, wherein like characters are used throughout to designate like elements, the embodiment of the invention depicted therein includes a reactor vessel 10 which houses the core 12, with cooling fluid being conveyed through this vessel and up through the core. This fluid enters through inlet 14 and exits through outlet 16. The core 12, of course, contains the nuclear fuel and in accordance with accepted practice this fuel is disposed so that the cooling fluid may pass up through the core with this fluid being heated during such traversal. As illustratively disclosed the core is comprised of numerous assemblies 18 among which are interspersed control devices 20 with the fuel assemblies and control devices being maintained in operative relationship by means of upper and lower grid plates 24 and 22 and with these devices preferably extending throughout the height of the core.

Each of the control devices 20 is comprised of a cylindrical housing 26 which may be fabricated of zirconium or some other acceptable material having a relatively low neutron absorption cross section.

Extending inwardly from the wall of cylindrical housing 26 in a radial direction and symmetrically arranged are a number of arms 28. These arms extend throughout the length of the housing and are of layered or composite construction with a portion of the arm identified as 30 containing a nuclear fuel, and the portion identified as 32 containing a nuclear poison (high neutron absorption cross section). The fuel may be enclosed in a zirconium casing as may the nuclear poison 32.

Mounted inwardly of the inner extremities of arms 28 and coaxial with housing 26 is the cylindrical hub member 34 and this hub member extends longitudinally throughout the length of housing 26. This hub is provided with longitudinally extending radially disposed arms 36 which are constructed in the same fashion as the arms 28 with the poison and fuel being reversed in respect to arms 28, i.e. in the arms 30 the fuel containing portion, layer or slab is disposed on the opposite side of the poison containing portion, layer or slab as compared with arms 28, with 32 identifying the poison containing portion and 30 identifying the fuel containing portion in arms 36 the same as in arms 28. The hub member 34 is rotatedly mounted within cylindrical housing 26, having a lower shaft-like projection 38 received within a suitable opening in the lower end wall of cylindrical housing 26 and having an upwardly extending shaft 40 extending through a similar opening in the upper end wall of the housing, with projection 38 and shaft 40 being coaxial with housing 26 and hub 34.

The control device 20 is received between the grid plates 22 and 24 in a manner which prevents rotation of cylindrical housing 26 while permitting rotation of hub 34 and its radially extending arms within the housing. The lower end of the housing 26 is received within a suitable recess in the lower grid 22 and in a manner which prevents rotation of the cylinder with relation to this plate. The upper end of the cylinder is guided by being received snugly in opening 42 in the upper grid plate 24.

The two sets of arms 28 and 36 are complementarily arranged so that when hub 34 is rotated to its extreme clockwise position as viewed in FIG. 4 the two poison containing portions in the respective sets of arms will be in engagement. When hub 34 is rotated to its extreme position in the counter-clockwise direction the fuel containing portions on the arms will be in engagement; with FIG. 5 disclosing the device in this extreme position.

When in the position disclosed in FIG. 4 the poison is masked by fuel on each side while when in the position disclosed in FIG. 5 the fuel is masked by poison. When moving from the FIG. 4 to FIG. 5 position the effect of the poison becomes progressively greater with the effective area of the poison as seen from the exterior of the control device being increased in moving from FIG. 4 to FIG. 5 position. This result is obtained because neutrons looking into the control device see a greater poison area (i.e. not masked by fuel) as the device is moved from its FIG. 4 to FIG. 5 position. Thus with the control device, reactivity in the core is the greatest when the device is in the FIG. 4 position and progressively decreases as it is moved to the FIG. 5 position, being the least when the device is in the FIG. 5 position.

Accordingly it will be appreciated that a control is provided with this invention that maintains a poison in the core at all times and does not adjust a poison into and out of the core so that there is no axial distortion of the flux with the control organization of the invention. Moreover only a rotary movement of the control is required with this facilitating a simple mechanical arrangement.

While we have illustrated and described a preferred embodiment of our novel organization it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What is claimed is:

1. A control device for a nuclear reactor adapted to control reactivity in the active portion of the reactor while remaining stationary relative to its central longitudinal axis and comprising a plurality of longitudinally extending stationary members, a plurality of members rotatable about an axis parallel with the longitudinal axis of the device with the stationary and movable members being outwardly extending with respect to said axis and alternately arranged and with the movable members moving to and from one position where the movable and stationary members, respectively, have a first set of complementary surfaces juxtaposed and another position where they have a second set of complementary surfaces juxtaposed, each of said stationary members and said rotatable members having a portion that contains a fuel and a portion that contains a poison with said fuel portions being in adjacent overlying relation when the movable members are in said one position and the poison portions being in adjacent overlying relation when the movable members are in said other position.

2. An elongated control device for a nuclear reactor comprising a plurality of stationary longitudinally extending, symmetrically arranged arms generally radially disposed with respect to the longitudinal axis of the device, additional similarly disposed arms intermediate the stationary arms and rotatable about said longitudinal axis to and from extreme positions in overlying relation with the stationary arms on opposite sides thereof, means for rotating the rotatable arms, the stationary and movable arms containing a fuel and a poison in different regions thereof and disposed so that when the rotatable arms are in one extreme position the fuel is sandwiched between poison and in another extreme position the poison is sandwiched between fuel.

3. An elongated control device for a nuclear reactor positionable within the core of the reactor and operative to vary the reactivity in the core solely through lateral movement of respective members of the device, said device including a plurality of stationary plate members extending outwardly from the central axis, similarly oriented plate members disposed between said stationary members and movable into and out of overlying engagement with the surface of the stationary members on each side thereof, each of the stationary and movable members including a fuel portion and a poison portion with these portions, respectively, extending generally over opposite surfaces of the plate members and with these portions on the stationary members being reversed with respect to those on the movable members, and means operative to move said movable members to and from overlying engagement with the stationary members on each side thereof.

References Cited in the file of this patent
UNITED STATES PATENTS
2,852,458    Dietrich et al. _____ Sept. 16, 1958